United States Patent
Yang

[11] Patent Number: 5,934,153
[45] Date of Patent: Aug. 10, 1999

[54] FOLDABLE ROD LINKAGE FOR CONNECTING A HANDGRIP TO A FRONT WHEEL OF A STROLLER

[76] Inventor: Chih-Huang Yang, 7F-1, No. 9-7, Sec.2, Chung-Kang Rd., Taichung City, Taiwan

[21] Appl. No.: 08/908,649

[22] Filed: Aug. 7, 1997

[51] Int. Cl.[6] .................................................. B62K 21/16
[52] U.S. Cl. .......................... 74/551.3; 74/551.2; 74/529; 74/551.4; 74/551.5; 403/102; 403/325; 280/642
[58] Field of Search ............................... 74/551.1, 551.2, 74/551.3, 551.4, 551.5, 551.6, 551.7, 527, 528, 529; 403/100, 102, 321, 325

[56] References Cited

U.S. PATENT DOCUMENTS

| | | | |
|---|---|---|---|
| 5,110,150 | 5/1992 | Chen | 280/642 |
| 5,244,228 | 9/1993 | Chiu et al. | 280/642 |
| 5,362,089 | 11/1994 | Jyan-Tsai | 403/325 X |
| 5,427,402 | 6/1995 | Huang | 403/102 X |
| 5,605,409 | 2/1997 | Haut | 403/102 |

*Primary Examiner*—Charles A. Marmor
*Assistant Examiner*—Ha Ho
*Attorney, Agent, or Firm*—Fish & Richardson P.C.

[57] ABSTRACT

A rod linkage includes a mount member, a pivotable body, a handle rod, and a front rod. The mount member has left and right lateral walls extending rearwardly from two ends of an upright front wall, an upward abutment wall between the left and right lateral walls, and an upright rear wall which extends downward from a distal side of the upward abutment wall to define an upright bore extending in a first axial direction for receiving an upper end of the front rod. The mount member further has left and right rear lateral walls which extend respectively from the left and right lateral walls and which are disposed below the upright rear wall to form seat portions. The pivotable body includes an elongated member provided with a second upright front wall, and a lower abutment portion supported on the seat portions. The elongated member has a through-hole to permit extension of the handle rod such that a lower end of the latter is pivoted on the rear lateral walls. A forward anchoring portion extends forwardly from the second upright front wall and includes a downward abutment wall to mate with the upward abutment wall when the linkage is in an unfolded position.

2 Claims, 6 Drawing Sheets

FOLDABLE ROD LINKAGE FOR CONNECTING A HANDGRIP TO A FRONT WHEEL OF A STROLLER

BACKGROUND OF THE INVENTION

1. Field of the Invention

The invention relates to a stroller, more particularly to a foldable rod linkage for connecting a handgrip of the stroller to a front wheel of the same.

2. Description of the Related Art

Referring to FIGS. 1 and 2, a foldable stroller is shown to include a handgrip 2a and a front wheel 1a which are interconnected by means of a conventional foldable rod linkage 3. As illustrated, the conventional foldable rod linkage 3 comprises a pivot retainer including a lower mount member 4 and an upper pivotable body 5, a handle rod 2, a front rod 1, and means for biasing the upper pivotable body 5 to move downward so as to abut against the lower mount member 4. The lower mount member 4 has a first upright front wall 401, left and right front lateral walls 402 which extend respectively and rearwardly from two upright lateral ends of the first upright front wall 401, and an upward abutment wall 403 which is disposed transversely between the left and right front lateral walls 402 and which converges upwardly with an upper end of the first upright front wall 401 to form an upwardly extending apex portion 403a. The lower mount member 4 further includes an upright bore 404 which extends in a first axial direction, and left and right rear lateral walls 405 which extend respectively from the left and right front lateral walls 402 and which are disposed rearwardly and below the upward abutment wall 403.

The upper pivotable body 5 includes a lower abutment portion 501 supported on the upward abutment wall 403 of the lower mount member 4 when the conventional foldable rod linkage is in an unfolded position, an upright through hole 5a which extend parallel to the first axial direction, and a downwardly opening blind bore 5d aligned with the upright bore 404 of the lower mount member 4.

The handle rod 2 has a lower end 20b extending through the upright through hole 5a of the upper pivotable body 5 so as to be mounted pivotally on the left and right rear lateral walls 405 at a pivot 4b, and an upper end 20a adapted to be connected to the handgrip 2a.

The front rod 1 is secured in the through bore 404 of the lower mount member 4 by the use of a rivet 4a, and has an upper end 10b and a lower end 10a adapted to be connected to the front wheel 1a.

The biasing means, such as a compression spring, biases the upper pivotable body 5 to move downward relative to the handle rod 2 so as to permit extension of the upper end 10b of the front rod 1 into the blind bore 5d of the upper pivotable body 5 and so as to abut the lower abutment portion 501 against the upward abutment wall 403 when the conventional foldable rod linkage 3 is in an unfolded position.

When desired, the upper pivotable body 5 can be lifted upward against biasing action of the biasing means to disengage the upper end 10b of the front rod 1 from the blind bore 5d and the lower abutment portion 501 from the upward abutment wall 403 such that the upper pivotable body 5 together with the handle rod 2 can be turned relative to the front rod 1 about the pivot 4a, thereby converting the conventional rod linkage 3 into a folded position.

In use, the pushing action of the user on the handgrip 2a creates a downwardly oriented force on the pivotable body 5 such that the latter may be turned relative to the lower mount member 4. As a result, disengagement of the pivotable body 5 from the lower mount member 4 is still possible.

SUMMARY OF THE INVENTION

The object of this invention is to provide a foldable rod linkage which can be used to interconnect a handgrip and a front wheel of a stroller and which is capable of overcoming the aforesaid disadvantage.

Accordingly, the foldable rod linkage of this invention for connecting one handgrip to one front wheel of a foldable stroller comprises a pivot retainer which includes a lower mount member and an upper pivotable body, a handle rod, a front rod, and means for biasing the upper pivotable body to move downward relative to the handle rod toward the lower mount body.

The lower mount member has a first upright front wall, left and right front lateral walls which extend respectively and rearwardly from two upright lateral ends of the first upright front wall, an upward abutment wall which is disposed transversely between the left and right front lateral walls and which converges upwardly with an upper end of the first upright front wall to form an upwardly extending apex portion, and an upright rear wall which extends downwardly from a distal side of the upward abutment wall relative to said apex portion so as to define with the latter an inserted portion. The inserted portion is formed with an upright bore that extends in a first axial direction and that opens at the upward abutment wall. The lower mount member further has left and right rear lateral walls which extend respectively from the left and right front lateral walls and which are disposed rearwardly and below the upright rear wall so as to form left and right upward seat portions.

The upper pivotable body includes an upright elongated member provided with a second upright front wall, and a lower abutment portion supported on the left and right upward seat portions when the foldable rod linkage is in an unfolded position. The upright elongated member has an upright through hole that extends in a second axial direction parallel to the first axial direction and that opens towards a space defined between the left and right upward seat portions. A forward anchoring portion extends forwardly from the second upright front wall, and includes a downward abutment wall to mate with the upward abutment wall when the foldable rod linkage is in the unfolded position. The downward abutment wall is disposed to be above and in a stepwise position relative to the lower abutment portion so as to define an upright forward facing section on the second upright front wall. A tab portion extends downward from a distal edge of the downward abutment wall relative to the second upright front wall such that the tab portion and the upright forward facing section flank the apex portion and the upright rear wall from respectively when the foldable rod linkage is in the unfolded position. A stud member extends downwardly from the downward abutment wall, and coincides with and is received in the upright bore when the foldable rod linkage is in the unfolded position.

The handle rod has an upper end adapted to be connected to the handgrip and a lower end inserted into and extending through the through hole of the upper pivotable body so as to be mounted pivotally on the left and right rear lateral walls at an axis below the left and right upward seat portions and transverse to the first axial direction.

The front rod has a lower end adapted to be connected to the front wheel and an upper end disposed under and coinciding with the upright bore of the lower mount member.

When the foldable rod linkage is in the unfolded position, the biasing means biases the upper pivotable body to move downward relative to the handle rod toward the lower mount member so as to bring the stud member into the upright bore and subsequently to abut the downward abutment wall and the lower abutment portion against the upward abutment wall and the left and right upward seat portions of the lower mount member, respectively.

The upper pivotable body can be lifted against biasing action of the biasing means, thereby removing the stud member out of the upright bore and disengaging the downward abutment wall and the lower abutment portion from the upward abutment wall and the left and right upward seat portions such that the handle rod together with the upper pivotable body can be turned relative to the front rod at the axis so as to convert the foldable rod linkage into a folded position.

BRIEF DESCRIPTION OF THE DRAWINGS

Other features and advantages of this invention will become apparent in the following detailed description of the preferred embodiment of this invention, with reference to the accompanying drawings, in which.

DETAILED DESCRIPTION OF THE PREFERRED EMBODIMENT

Figure 1:
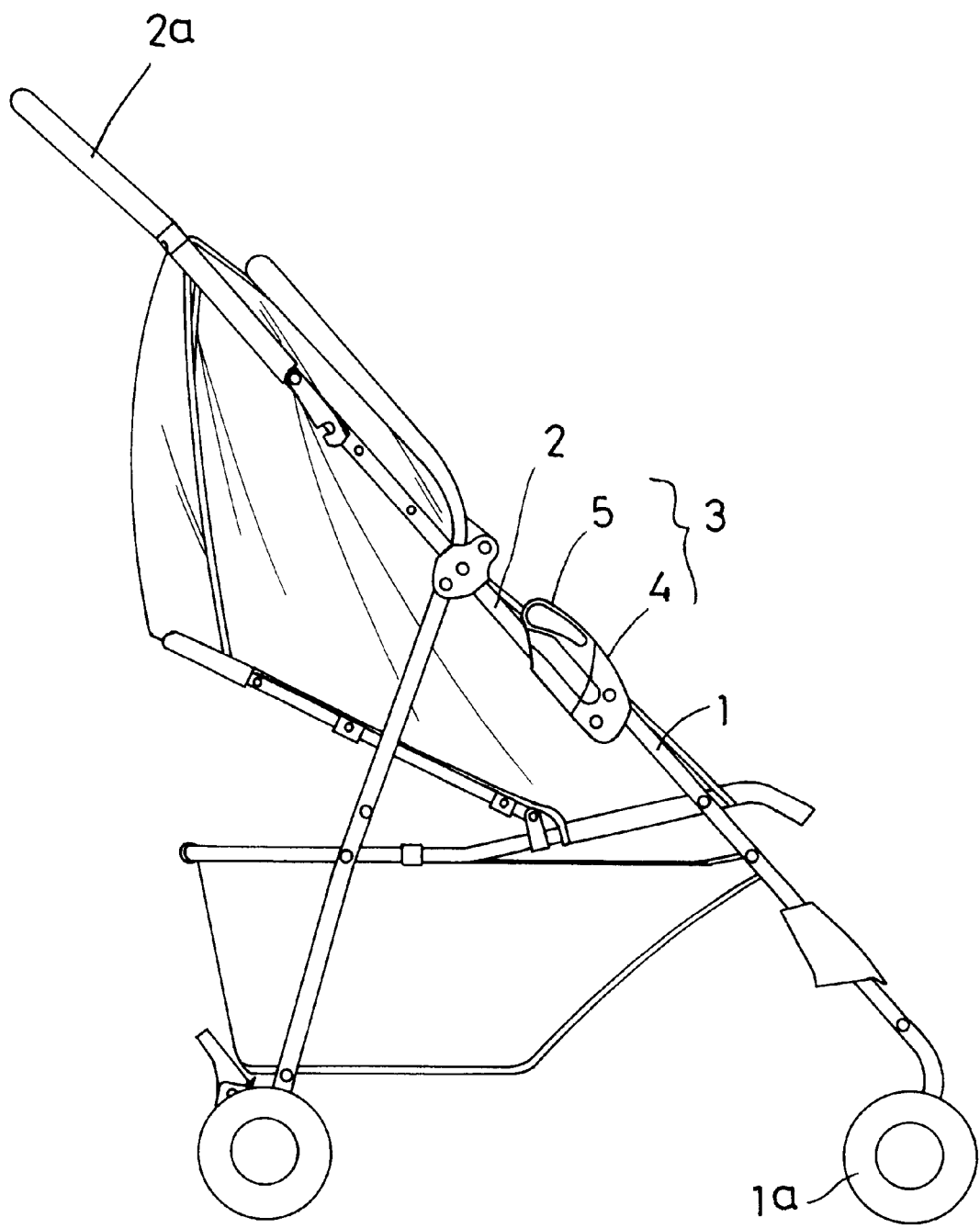
FIG. 1 illustrates a foldable stroller which has a handgrip and a front wheel that are interconnected by means of a conventional foldable rod linkage.
Figure 2:
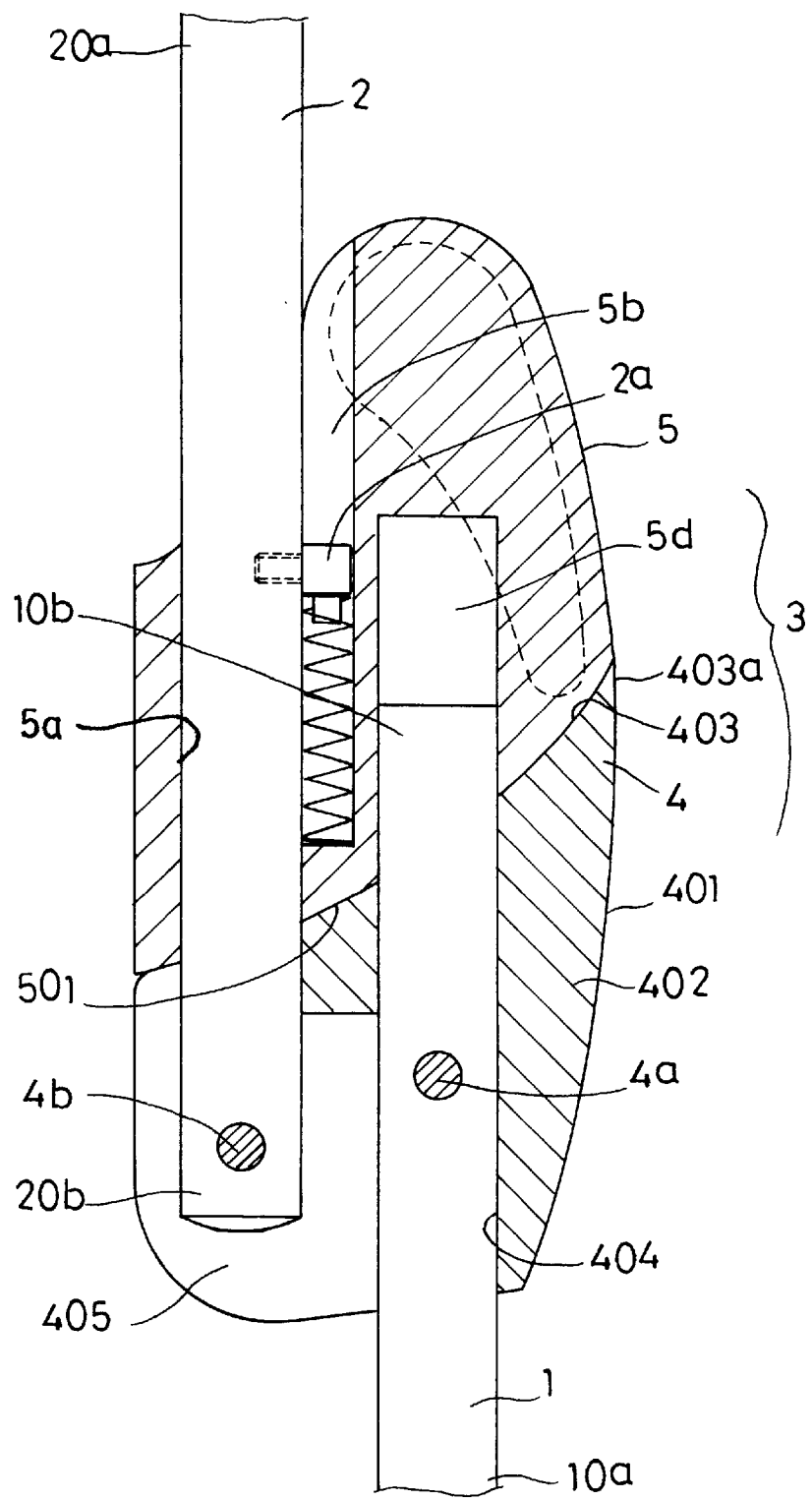
FIG. 2 is a partly sectional view of the conventional foldable rod linkage.
Figure 3:
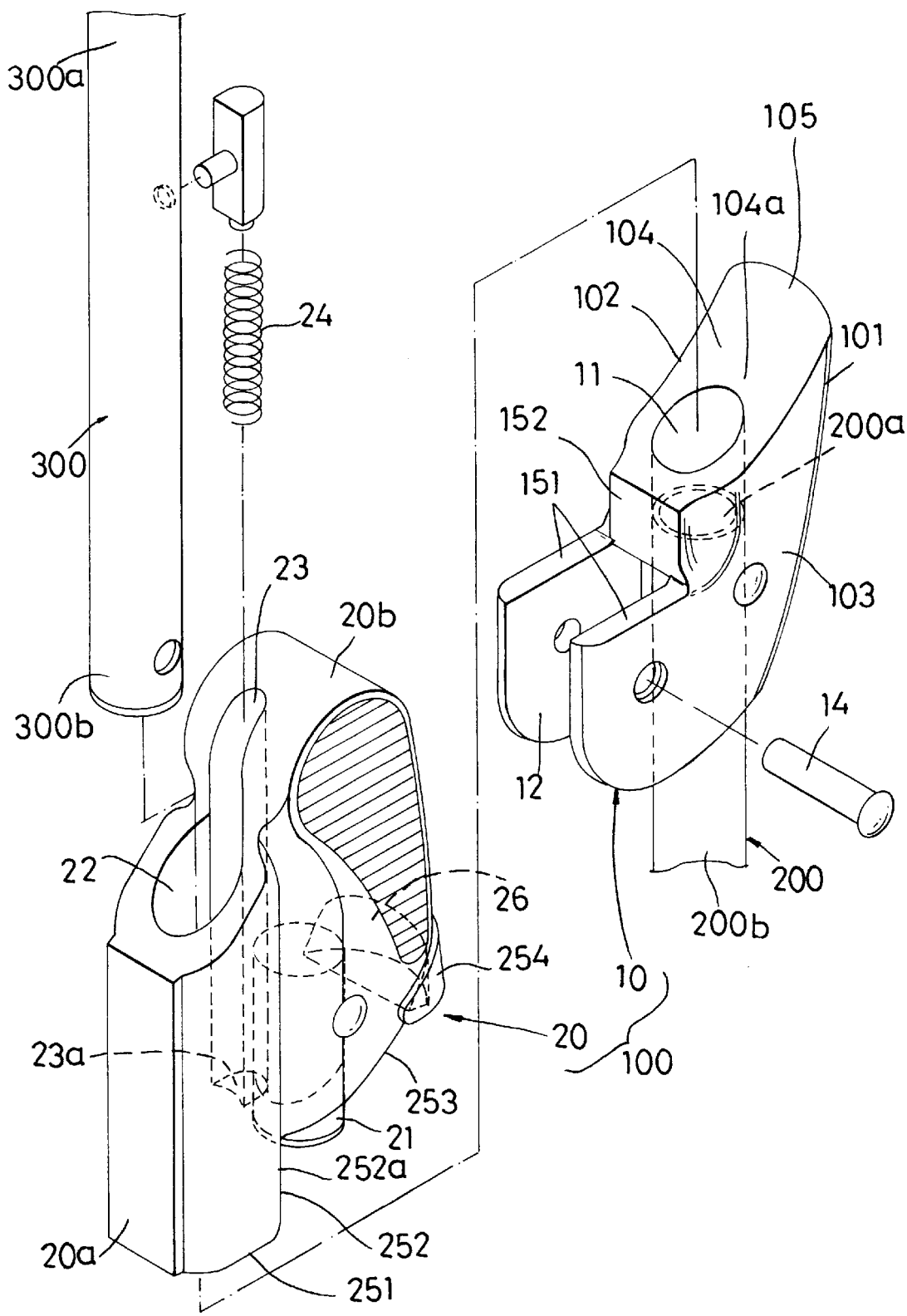
FIG. 3 is an exploded view of the preferred embodiment of a foldable rod linkage of this invention for connecting a handgrip and a front wheel of a stroller.
Figure 4:
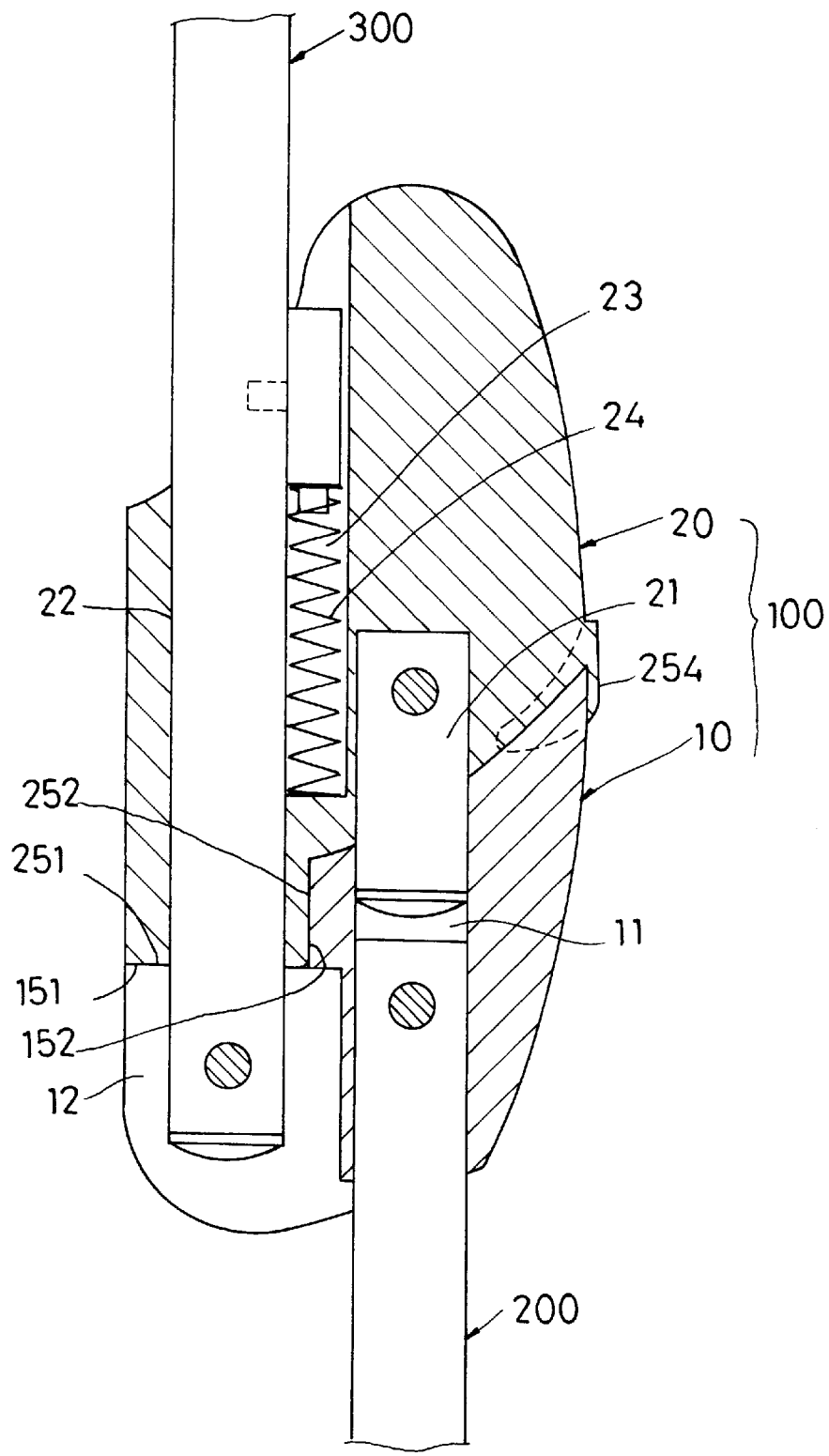
FIG. 4 is a partly sectional view of the preferred embodiment in an unfolded position.

Referring to FIGS. 3 and 4, the preferred embodiment of a foldable rod linkage for connecting a handgrip to a front wheel of a stroller in accordance with this invention is shown to comprise a pivot retainer 100 which includes a lower mount member 10 and an upper pivotable body 20, a handle rod 300, a front rod 200, and means for biasing the upper pivotable body 20 to move downward relative to the handle rod 300 toward the lower mount member 10.

The lower mount member 10 has a first upright front wall 101, left and right front lateral walls 102, 103 which extend respectively and rearwardly from two upright lateral ends of the first upright front wall 101, an upward abutment wall 104 which is disposed transversely between the left and right front lateral walls 102, 103 and which converges upwardly with an upper end of the first upright front wall 101 to form an upwardly extending apex portion 105, and an upright rear wall 152 which extends downwardly from a distal side of the upward abutment wall 104 relative to the apex portion 105 so as to define an inserted portion 104a. The inserted portion 104a is formed with an upright bore 11 which extends in a first axial direction and which opens at the upward abutment wall 104. The lower mount member 10 further has left and right rear lateral walls 12 which extend respectively from the left and right front lateral walls 102, 103 and which are disposed rearwardly and below the upright rear wall 152 so as to form left and right upward seat portions 151.

The upper pivotable body 20 includes an upright elongated member 20a provided with a second upright front wall 252, and a lower abutment portion 251 supported on the left and right upward seat portions 151 when the foldable rod linkage is in an unfolded position. The upright elongated member 20a has an upright through hole 22 which extends in a second axial direction parallel to the first axial direction and which opens to wards a space defined between the left and right upward seat portions 151. A forward anchoring portion 20b extends forwardly and integrally from the second upright front wall 252 of the elongated member 20a, and includes a downward abutment wall 253 to mate with the upward abutment wall 104 when the foldable rod linkage is in the unfolded position. The downward abutment wall 253 is disposed to be above and in a stepwise position relative to the lower abutment portion 251 so as to define an upright forward facing section 252a on the second upright front wall 252. A tab portion 254 extends downwardly from a distal edge of the downward abutment wall 253 relative to the second upright front the wall 252 such that the tab portion 254 and the upright forward facing section 252a flank the apex portion 105 and the upright rear wall 152, respectively, when the foldable rod linkage is in the unfolded position. A stud member 21 extends downward from the downward abutment wall 253, and coincides with and is received in the upright bore 11 when the foldable rod linkage is in the unfolded position.

The handle rod 300 has an upper end 300a adapted to be connected to the handgrip of the stroller (not shown), and a lower end 300b which is inserted into and which extends downwardly and outwardly of the upright through hole 22 of the upper pivotable body 20 so as to be mounted pivotally on the left and right rear lateral walls 12 at a position below the left and right upward seat portions 151. A pivot 14 is used for mounting of the lower end 300b of the handle rod 300 and serves as an axis which extends transverse to the first axial direction.

The front rod 200 has a lower end 200b adapted to be connected to the front wheel (not shown), and an upper end 200a which is disposed under and which coincides with the upright bore 11.

The biasing means biases the upper pivotable body 20 to move downward relative to the handle rod 300 toward the lower mount member 10 so as to bring the stud member 21 into the upright bore 11 and subsequently to abut the downward abutment wall 253 and the lower abutment portion 251 against the upward abutment wall 104 and the left and right upward seat portion 151 of the lower mount member 10, respectively, when the foldable rod linkage is in the unfolded position.

In the preferred embodiment, the upper pivotable body 20 further includes a spring-retaining blind bore 23 formed between the upright elongated member 20a and the forward anchoring portion 20b. The blind bore 23 extends in a direction parallel to the first axial direction, and has a spring-abutment bottom 23a transverse to the first axial direction. The biasing means includes a compression spring 24 having one end mounted on the handle rod 300 and an opposite end disposed at the spring-abutment bottom 23a so as to urge the downward abutment wall 253 and the lower abutment portion 251 toward the upward abutment wall 104 and the left and right upward seat portions 151 of the lower mount member 10.

Figure 5:
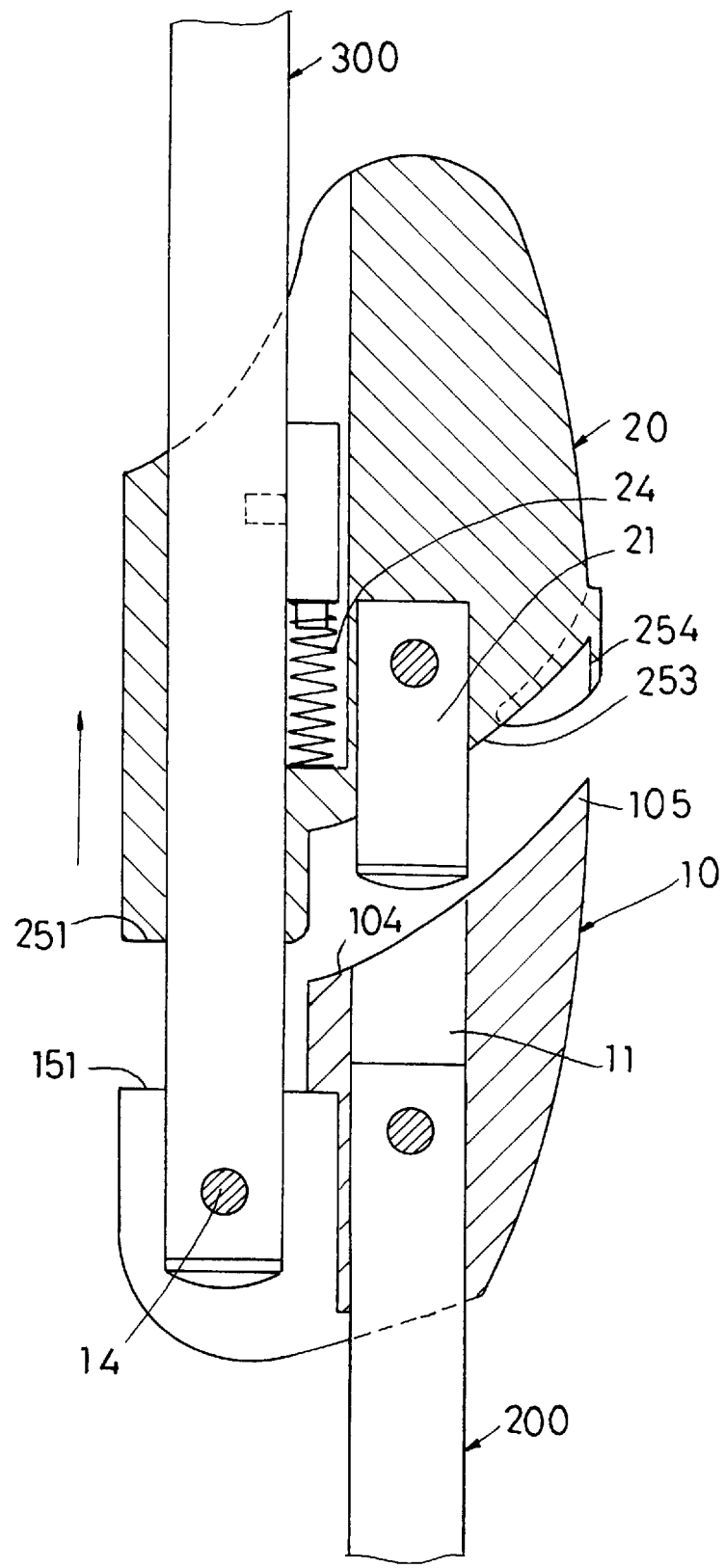
FIG. 5 is a partly sectional view of the preferred embodiment, wherein the upper pivotable body is lifted with respect to the lower mount member.
Figure 6:
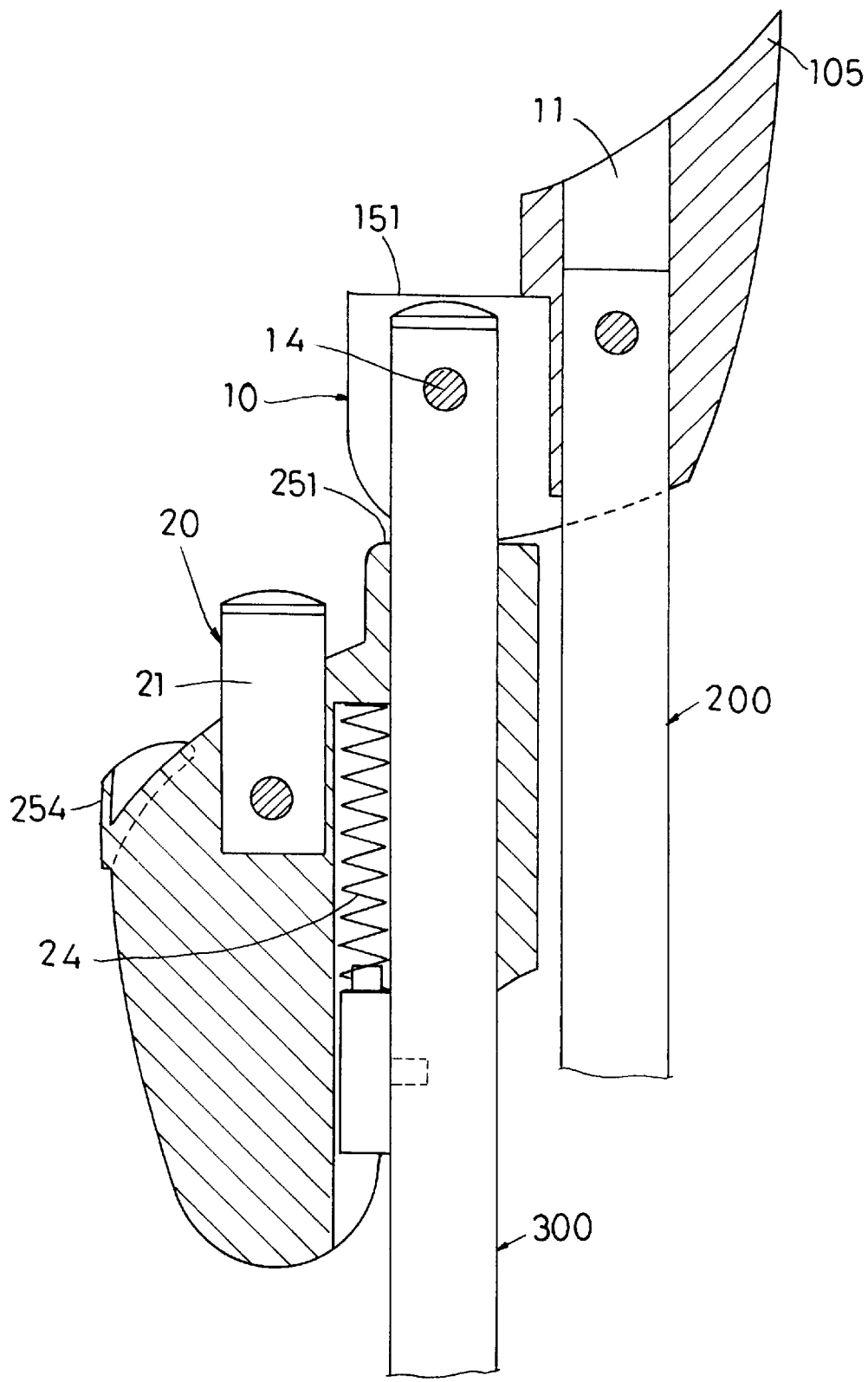
FIG. 6 is a partly sectional view of the preferred embodiment in a folded position.

As illustrated in FIGS. 5 and 6, when it is desired to convert the foldable rod linkage of this invention into a folded position, the upper pivotable body 20 can be lifted against the biasing action of the compression spring 24, thereby removing the stud member 21 out of the upright bore 11 and disengaging the downward abutment wall 253 and the lower abutment portion 251 from the upward abutment wall 104 and the left and right upward seat portions 151. Under this condition, the handle rod 300 together with the upper pivotable body 20 can be turned relative to the front rod 200 at the pivot 14 so as to convert the foldable rod linkage into the folded position.

Note that when the foldable rod linkage of this invention is at the unfolded position, the tab portion 254 and the upright forward facing section 252a (see FIG. 3) flank the apex portion 105 and the upright rear wall 152 which subsequently prevent rotation of the handle rod 300 and the front rod 200 relative to each other.

With this invention thus explained, it is apparent that numerous modifications and variations can be made without departing from the scope and spirit of this invention. It is therefore intended that this invention be limited only as indicated in the appended claims.

I claim:

1. A foldable rod linkage for connecting one handgrip to a front wheel of a foldable stroller, comprising:

(a) a pivot retainer including:

a lower mount member having a first upright front wall;

left and right front lateral walls extending respectively and rearwardly from two upright lateral ends of said first upright front wall;

an upward abutment wall disposed transversely between said left and right front lateral walls and converging upwardly with an upper end of said first upright front wall to form an upwardly extending apex portion;

an upright rear wall extending downwardly from a distal side of said upward abutment wall relative to said apex portion so as to define an inserted portion which has an upright bore extending in a first axial direction and opening at said upward abutment wall; and left and right rear lateral walls extending respectively from said left and right front lateral walls and disposed rearwardly and below said upright rear wall so as to form left and right upward seat portions; and an upper pivotable body including an upright elongated member provided with a second upright front wall, and a lower abutment portion supported on said left and said right upward seat portions when the foldable rod linkage is in an unfolded position, said upright elongated member having an upright through hole extending in a second axial direction which is parallel to said first axial direction and opening towards a space defined between said left and said right left upward seat portions;

a forward anchoring portion extending forwardly from said second upright front wall, and including a downward abutment wall to mate with the upward abutment wall when the foldable rod linkage is in said unfolded position, said downward abutment wall being disposed to be above and in a stepwise position relative to said lower abutment portion so as to define an upright forward facing section on said second upright front wall;

a tab portion extending from a distal edge of said downward abutment wall relative to said second upright front wall, wherein said tab portion and said upright forward facing section flank said apex portion and said upright rear wall respectively when said foldable rod linkage is in the unfolded position; and a stud member extending downwardly from said downward abutment wall and coinciding with and being received in said upright bore when the foldable rod linkage is in the unfolded position;

(b) a handle rod having an upper end adapted to be connected to the handgrip and a lower end inserted into and extending downwardly and outwardly of said upright through hole so as to be mounted pivotally on said left and said right rear lateral walls at an axis below said left and right upward seat portions and transverse to said first axial direction;

(c) a front rod having a lower end adapted to be connected to the front wheel and an upper end disposed under and coinciding with said upright bore; and (d) means for biasing said upper pivotable body to move downward relative to said handle rod toward said lower mount member so as to bring said stud member into said upright bore and subsequently to abut said downward abutment wall and said lower abutment portion against said upward abutment wall and said left and right upward seat portions of said lower mount member respectively when the foldable rod linkage is in the unfolded position;

whereby, while said upper pivotable body is being lifted against biasing action of said biasing means, thereby removing said stud member out of said upright bore and disengaging said downward abutment wall and said lower abutment portion from said upward abutment wall and said left and right upward seat portions, said handle rod together with said upper pivotable body can be turned relative to said front rod at said axis so as to convert the foldable rod linkage into a folded position.

2. The foldable rod linkage as defined in claim 1, wherein said upper pivotable body further includes a spring-retaining bore formed between said upright elongated member and said forward anchoring portion, said spring-retaining bore extending in a direction parallel to said first axial direction and having a spring-abutment bottom transverse to said first axial direction, said biasing means including a compression spring having one end mounted on said handle rod and an opposite end disposed at said spring-abutment bottom so as to urge said downward abutment wall and said lower abutment portion toward said upward abutment wall and said left and right upward seat portions of said lower mount member.

\* \* \* \* \*